Oct. 27, 1970
D. J. HURLEY ET AL  3,536,593
PROCESS FOR SEPARATING HYDROCARBONS FROM AMINES BY
CONVERSION TO AMINE SALTS AND
AZEOTROPE DISTILLATION
Filed Sept. 25, 1968
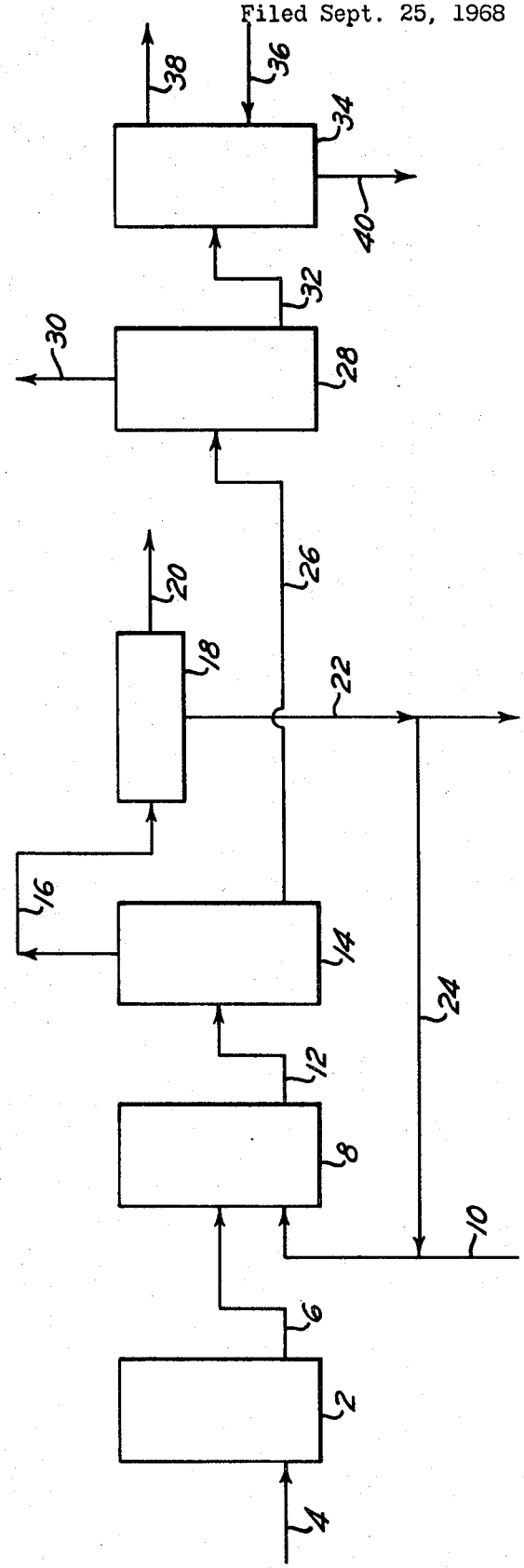
INVENTORS.
DANIEL J. HURLEY
ROBERT W. ROSENTHAL

# United States Patent Office 3,536,593
Patented Oct. 27, 1970

3,536,593
PROCESS FOR SEPARATING HYDROCARBONS FROM AMINES BY CONVERSION TO AMINE SALTS AND AZEOTROPE DISTILLATION
Daniel J. Hurley, Oakmont, and Robert W. Rosenthal, Pittsburgh, Pa., assignors to Gulf Research & Development Company, Pittsburgh, Pa., a corporation of Delaware
Filed Sept. 25, 1968, Ser. No. 762,600
Int. Cl. B01d 3/36
U.S. Cl. 203—34                    8 Claims

ABSTRACT OF THE DISCLOSURE

Process for separating an amine from a hydrocarbon which involves treating a mixture containing the two with a mineral acid to convert the amine to the corresponding amine salt, subjecting the resulting mixture to azeotrope distillation in the presence of ethylene glycol or propylene glycol to remove overhead an azeotrope of the glycol and the hydrocarbon and then converting the amine salt to the corresponding amine.

This invention relates to a process for separating a hydrocarbon from an amine.

Amines and hydrocarbons can often be found in association with each other. For many reasons, for example, when a pure amine is sought and the hydrocarbon is present as an impurity, it may be desirable to subject the mixture to distillation conditions to effect such purification. However, in many cases distillation may not be feasible when the mixture contains amines and hydrocarbons of varying carbon numbers having overlapping boiling points or when the amine or amines present may have a tendency to decompose under the proposed distillation conditions. Our procedure is simple and effective and can be employed to separate amines from hydrocarbons over a wide range of carbon numbers.

The amines present in the mixture treated herein can be represented by the following general formula:

wherein $R_1$, $R_2$ and $R_3$, the same or different, can be hydrogen or an alkyl having from one to thirty carbon atoms, preferably from one to twenty carbon atoms, such as methyl, ethyl, n-propyl, sec-butyl, t-butyl, hexyl, 2-dodecyl, 4-tetradecyl, n-triacontyl, etc.; aryl substituents having from six to 22 carbon atoms, preferably from six to twelve carbon atoms, such as phenyl, benzyl, naphthyl, tolyl, xylyl, dodecylphenyl, etc.; and heterocyclic substituents having from four to 22 carbon atoms, preferably from four to twelve carbon atoms, such as pyrryl, pyridyl, thiophenyl, furyl, furfuryl, pyryl, etc. Preferably the sum of the carbon atoms in $R_1$, $R_2$ and $R_3$ should be at least two, but generally at least six. Representative amines that can be present are octylamine, methyldodecylamine, dimethyldodecylamine, methylhexadecylamine, phenylethyloctadecylamine, 3 - hexylethyleicosylamine, 2-butylfurfurylhexylamine, etc.

The hydrocarbons in association with the amines defined above can be straight and branched chained having from seven to 22 carbon atoms, preferably from ten to eighteen carbon atoms, such as n-decane, n-tetradecane, n-octadecane, 2 - methyl - 2 - hexadecane, 4-butyl-n-tetradecane, etc.; alicyclic hydrocarbons having from seven to 22 carbon atoms, preferably from ten to twenty carbon atoms, such as methylcyclohexane, diethylcyclohexane, butylcyclopentane, heptyloctylcyclopentane, cyclooctane, cyclododecane, etc.; and aromatic hydrocarbons having from seven to 22 carbon atoms, preferably from eight to fifteen carbon atoms, such as toluene, xylene, methylethylbenzene, naphthalene and pentylnaphthalene.

The amount of amine and hydrocarbon that can be present in the mixture can vary over wide limits, but in general about one to about 99 percent by weight preferably about ten to about 99 percent by weight of the mixture will be amine, with the remainder being hydrocarbon. A mixture that can be treated in accordance with the procedure defined herein can be found in U.S. Pat. No. 3,366,686. Despite precautions taken, the amine produced therein will contain some hydrocarbon impurity. By following the process of this invention the amine can easily be purified of its hydrocarbon impurity.

The process defined herein can be illustrated by reference to the accompanying drawing which is hereby incorporated in and made part of the present specification. The amine-hydrocarbon mixture to be treated is placed in vessel 2 and a concentrated or dilute mineral acid, such as hydrochloric acid, sulfuric acid, phosphoric acid, hydrobromic acid and nitric acid, but especially HCl, is introduced therein by line 4. For purpose of simplicity, it will be assumed in the discussion that follows that HCl was employed. Intimate contact between the mixture and HCl is maintained, for example, for a period of about five to about sixty, preferably about fifteen to about thirty minutes, at a temperature of about 0° to about 75° C., preferably about 10° to about 40° C., and a pressure of about 0 to about 1000 pounds per square inch gauge, preferably a pressure of about 0 to about 50 pounds per square inch gauge, as a result of which the HCl reacts with the amine to form the amine salt thereof. The amount of HCl needed, therefore, is at the least the amount required stoichiometrically to react with the amine to form the corresponding salt thereof.

The resulting mixture of amine salt and hydrocarbon are then passed by line 6 to vessel 8. Also introduced therein, by line 10, is ethylene glycol or propylene glycol. The amount of ethylene glycol or propylene glycol employed can vary over wide limits but must be sufficient to form an azeotrope with the paraffin present. The amount present, relative to the paraffin, must be at least about one percent by weight, but can be from about 25 to about 100 percent by weight. Conditions in vessel 8 can be, for example, from about 0° to about 75° C., preferably about 10° to about 40° C., and the pressure about 0 to about 50 pounds per square inch gauge, preferably about zero to about five pounds per square inch gauge. Residence time can be as low as about one minute, but can be from about five to about ten minutes.

The mixture of amine, paraffin and ethylene glycol or propylene glycol is then led by line 12 to distillation zone 14 wherein under suitable conditions, such as a temperature of about 50° to about 200° C., preferably about 75° to about 125° C., a pressure of about one to about 760 millimeters of mercury, preferably about 20 to about 100 millimeters of mercury, an azeotrope of ethylene glycol or propylene glycol and hydrocarbon is removed overhead by line 16. If the acid introduced into the system by line 4 is aqueous, water is removed overhead by line 16 prior to removal of said azeotrope.

The azeotrope is passed by line 16 to condenser 18 wherein, for example, at a temperature of about 0° to about 60° C., preferably about 10° to about 40° C., and a pressure of about one to about 760 millimeters of mercury, preferably about 20 to about 100 millimeters of mercury, the azeotrope is separated into its component parts. Paraffin is removed from condenser 18 by line 20 and ethylene glycol or propylene glycol by line 22. In a preferred embodiment the latter is recycled by line 24 to line 10.

If desired, vessels 2, 8 and 14 can be but a single vessel, and the individual steps described above can be carried successively therein. In such case, the glycol can be recycled continuously to the single vessel.

The amine salt plus residual ethylene glycol or propylene glycol is removed from distillation zone 14 by lines 26 and passed to distillation zone 28 wherein, for example, at a temperature of about 50° to about 200° C., preferably about 75° to about 125° C., and a pressure of about one to about 760 millimeters of mercury, preferably about 20 to about 100 millimeters of mercury the remaining ethylene glycol or propylene glycol is removed overhead by line 30. Preferably, the latter is also recycled to line 10. If desired distillation vessels 14 and 28 can be the same.

The amine salt is then passed by line 32 to vessel 34. Any suitable aqueous base, for example, hydroxides such as sodium hydroxide, potassium hydroxide, calcium hydroxide; carbonates such as sodium carbonate and potassium carbonate; and oxides such as calcium oxide and barium oxide, is introduced therein by line 36 for the purpose of converting the amine salt back to the original amine. Thus, the amount of base needed is that amount stiochiometrically required for the desired reaction, but, based on the amine salt, from about 1.0 to about 1.5 equivalent of base can be employed. Conditions that can be maintained in vessel 34 can be about 0° to about 60° C., preferably about 20° to about 40° C., pressure about 0 pound per square inch gauge, preferably about 0 to about five pounds per square inch gauge and a residence time of about one to about 30 minutes, preferably about five to about 15 minutes. The resulting amine is removed from vessel 34 by line 38 and an aqueous solution of salt by line 40.

The process of this invention can be further illustrated by the following:

EXAMPLE I 678 grams of hexadecane was converted into a mixture of 2-, 3-, 4-, 5-, 6-, 7- and 8-hexadecanones and 1-, 2-, 3-, 4-, 5-, 6-, 7- and 8-nitrohexadecanes by the identical procedure of Example II of U.S. Pat. No. 3,366,686, except that hexadecane was substituted for tridecane of the example. The resulting mixture was then converted into a mixture of 1-, 2-, 3-, 4-, 5-, 6-, 7- and 8-aminohexadecanes by the identical procedure of Example III of U.S. Pat. No. 3,366,686, except that the hexadecane derivatives were used instead of the dodecane derivatives. The hydrogenated mixture contained hexadecane impurity.

A mixture consisting of ten milliliters of the above mixture plus forty milliliters of hexadecane was stirred for one hour at room temperature with six milliliters (0.073 mol) of 37 percent aqueous hydrochloric acid. Two hundred milliliters of ethylene glycol was added and the mixture was distilled at 20 millimeters of mercury pressure. There was obtained at 108° C. an azeotrope consisting of 36 milliliters of hexadecane and 140 milliliters of ethylene glycol. Then the remaining ethylene glycol (54 milliliters) was distilled over at 112° C. The residue was stirred with 70 millilters of water containing 4.08 grams (0.073 mol) of KOH. The mixture separated into two layers, the top of which (10 milliliters) was shown by gas liquid chromatography to be purified aminohexadecanes.

EXAMPLE II

Five hundred and ten milliliters of a $C_{14}$–$C_{18}$ paraffin blend was nitrated to about 15 percent conversion with liquid $NO_2$ at 180° C. by the identical procedure of Example II of U.S. Pat. No. 3,366,686, except that a $C_{14}$–$C_{18}$ paraffin blend was used instead of tridecane. This mixture was dissolved in 510 milliliters of n-propanol containing 30 grams of ammonia and was simultaneously hydrogenated and reductively aminated by the identical procedure of Example III of U.S. Pat. No. 3,366,686, except that hexadecane derivatives were used instead of dodecane derivatives. There was thus obtained a mixture of unreacted $C_{14}$–$C_{18}$ paraffin and a mixture of statistically distributed monoamino derivatives of $C_{14}$–$C_{18}$ paraffins.

The propanolic mixture obtained above was stirred while 50 grams of HCl gas was added. The propanol was distilled off and 200 milliliters of ethylene glycol was added. A top layer of 570 milliliters of paraffin formed and was separated. The rest was distilled at 20 millimeters of mercury at about 100° C. and a heterogeneous ethylene glycol-paraffin azeotrope distilled over. The ethylene glycol (heavier layer) was returned continuously to the pot during the distillation. An additional 54 milliliters of paraffin was thus recovered. The excess ethylene glycol was distilled off at 112° C. per 20 millimeters of mercury, water containing about two equivalents of base was added, and the amines separated as a top layer. Distillation of the organic layer yielded 185.5 grams of statistically distributed monoamino paraffins ($C_{14}$–$C_{18}$) distilling at 115° to 140° C./1 millimeter of mercury and a residue of 50 grams.

Obviously, many modifications and variations of the invention, as hereinabove set forth, can be made without departing from the spirit and scope thereof, and therefore only such limitations should be imposed as are indicated in the appended claims.

We claim:
1. Process for separating an amine from a hydrocarbon which comprises treating a mixture containing said amine and said hydrocarbon with a mineral acid to convert said amine to the corresponding salt, subjecting said hydrocarbon and said amine salt to distillation in the presence of a glycol selected from the group consisting of ethylene glycol and propylene glycol to separate an azeotrope of said glycol and said hydrocarbon from said amine salt and thereafter treating said amine salt to convert the same to the corresponding amine.

2. The process of claim 1 wherein said glycol is ethylene glycol.

3. The process of claim 1 wherein said glycol is propylene glycol.

4. The process of claim 1 wherein said mineral acid is HCl.

5. The process of claim 1 wherein said amine salt is obtained at a temperature of about 0° to about 75°.

6. The process of claim 1 wherein said azeotrope is maintained at a temperature of 0° to about 60° C., whereby said glycol and said hydrocarbon are separated from each other, and thereafter recycling said separated glycol to said distillation stage.

7. The process of claim 1 wherein said conversion of said amine salt to the corresponding amine is effected by treating said amine salt with sodium hydroxide.

8. The process of claim 1 wherein said amine is represented by the following general formula:

wherein $R_1$, $R_2$ and $R_3$ are selected from the group consisting of alkyl, aryl and heterocyclic groups.

References Cited

UNITED STATES PATENTS

| | | | |
|---|---|---|---|
| 2,360,685 | 10/1944 | Jensen | 203—64 |
| 3,366,686 | 1/1968 | Rosenthal et al. | 260—583 |
| 3,410,906 | 11/1968 | Simpson et al. | 260—583 |
| 3,467,580 | 9/1969 | Weisang et al. | 203—38 |
| 3,470,251 | 9/1969 | Siegart et al. | 260—583 |

WILBUR L. BASCOMB, Jr., Primary Examiner

U.S. Cl. X.R.

203—33, 35, 36, 37, 64; 260—583